United States Patent
Lang et al.

(10) Patent No.: US 11,616,367 B2
(45) Date of Patent: Mar. 28, 2023

(54) ENERGY STORAGE SYSTEM WITH VIRTUAL DEVICE MANAGER

(71) Applicant: Johnson Controls Technology Company, Auburn Hills, MI (US)

(72) Inventors: Eric G. Lang, Milwaukee, WI (US); Donald A. Gottschalk, Racine, WI (US)

(73) Assignee: Johnson Controls Technology Company, Auburn Hills, MI (US)

( * ) Notice: Subject to any disclaimer, the term of this patent is extended or adjusted under 35 U.S.C. 154(b) by 1065 days.

(21) Appl. No.: 15/953,313

(22) Filed: Apr. 13, 2018

(65) Prior Publication Data

US 2019/0020203 A1     Jan. 17, 2019

Related U.S. Application Data

(60) Provisional application No. 62/533,539, filed on Jul. 17, 2017.

(51) Int. Cl.
   *G05B 15/02*     (2006.01)
   *H02J 3/32*     (2006.01)
   (Continued)

(52) U.S. Cl.
   CPC ............... *H02J 3/32* (2013.01); *G05B 15/02* (2013.01); *H02J 13/00002* (2020.01); *H04L 12/2816* (2013.01); *H04L 12/4625* (2013.01)

(58) Field of Classification Search
   CPC ......... Y02E 10/76; Y02E 10/50; Y02E 70/30; Y02E 40/70; Y02E 10/46; Y02E 60/60;
   (Continued)

(56) References Cited

U.S. PATENT DOCUMENTS 8,903,554 B2    12/2014   Stagner
2009/0271365 A1*   10/2009   Chen .................. G06F 9/451
                                                         707/E17.031

(Continued)

OTHER PUBLICATIONS

Etherden et al. Virtual Power Plan for Grid Services Using IEC 61850 IEEE Transactions on Industrial Informatics, vol. 12, No. 1, Feb. 2016 (Year: 2016).*

(Continued)

*Primary Examiner* — Rehana Perveen
*Assistant Examiner* — Cuong V Luu
(74) *Attorney, Agent, or Firm* — Foley & Lardner LLP

(57) ABSTRACT

An energy storage system includes a plurality of physical devices and an integration engine. The physical devices include at least a battery and a power inverter operable to charge and discharge the battery. Each of the physical devices stores one or more data points. The integration engine includes a processing circuit having a processor and memory. The memory stores a virtual device network including a plurality of virtual devices and a virtual device manager. Each of the virtual devices includes one or more attributes. The virtual device manager is configured to map the attributes of the virtual devices to corresponding data points stored by the physical devices and update the attributes of the virtual devices in response to detecting changes in value of the corresponding data points stored by the physical devices.

18 Claims, 5 Drawing Sheets

(51) Int. Cl.
  *H04L 12/46* (2006.01)
  *H04L 12/28* (2006.01)
  *H02J 13/00* (2006.01)

(58) Field of Classification Search
  CPC ......... Y02E 10/70; Y02E 60/10; Y02E 10/52;
    Y02E 20/14; Y02E 10/44; H02J 2300/28;
    H02J 3/383; H02J 2203/20; H02J 3/00;
    H02J 3/14; H02J 3/06; H02J 3/003; H02J
    13/00002; H02J 3/46; H02J 7/0071; H02J
    13/00006; H02J 3/24; H02J 15/00; G05D
    23/19; G06F 17/50; G05F 1/67; G05B
    13/04; B60L 11/00
  See application file for complete search history.

(56) References Cited

U.S. PATENT DOCUMENTS

| | | | |
|---|---|---|---|
| 2010/0235206 A1* | 9/2010 | Miller | G06Q 10/063 705/7.11 |
| 2012/0221124 A1* | 8/2012 | Thiele | G05B 13/042 700/31 |
| 2013/0166081 A1 | 6/2013 | Sanders et al. | |
| 2014/0029196 A1* | 1/2014 | Smith | H05K 7/20836 361/679.53 |
| 2014/0074311 A1* | 3/2014 | Kearns | H02J 3/38 700/297 |
| 2014/0278709 A1* | 9/2014 | Rohr | G05D 23/1917 705/7.25 |
| 2014/0337001 A1* | 11/2014 | Dayalan | G06F 30/20 703/13 |
| 2015/0316902 A1 | 11/2015 | Wenzel et al. | |
| 2015/0316907 A1* | 11/2015 | Elbsat | G05B 13/048 700/275 |
| 2016/0377306 A1 | 12/2016 | Drees et al. | |
| 2017/0000515 A1 | 1/2017 | Akagane | |
| 2017/0005515 A1 | 1/2017 | Sanders et al. | |
| 2017/0102162 A1 | 4/2017 | Drees et al. | |
| 2017/0102433 A1 | 4/2017 | Wenzel et al. | |
| 2017/0102434 A1 | 4/2017 | Wenzel et al. | |
| 2017/0102675 A1 | 4/2017 | Drees | |
| 2017/0103483 A1 | 4/2017 | Drees et al. | |
| 2017/0104332 A1 | 4/2017 | Wenzel et al. | |
| 2017/0104336 A1 | 4/2017 | Elbsat et al. | |
| 2017/0104337 A1 | 4/2017 | Drees | |
| 2017/0104342 A1 | 4/2017 | Elbsat et al. | |
| 2017/0104343 A1 | 4/2017 | Elbsat et al. | |
| 2017/0104344 A1 | 4/2017 | Wenzel et al. | |
| 2017/0104345 A1 | 4/2017 | Wenzel et al. | |
| 2017/0104346 A1 | 4/2017 | Wenzel et al. | |
| 2017/0104449 A1 | 4/2017 | Drees | |
| 2018/0031641 A1 | 2/2018 | Drees | |
| 2018/0034285 A1 | 2/2018 | Baumgartner et al. | |
| 2018/0034286 A1 | 2/2018 | Dorneanu et al. | |
| 2018/0054061 A1 | 2/2018 | Dorneanu et al. | |
| 2018/0154779 A1* | 6/2018 | Chol | B60L 58/22 |
| 2018/0331543 A1* | 11/2018 | Palombini | H02M 3/33584 |
| 2020/0183436 A1* | 6/2020 | Ohori | G05F 1/67 |

OTHER PUBLICATIONS

Hong Development of a BACnet_ZigBEE Gateway for Demand Response in Buildings Pan African International Conference on Information Science, Computing and Telecommunication, 2013 (Year: 2013).*

Office Action on EP 18183902.8, dated Sep. 4, 2020, 7 pages.

Arthur J Helmicki, Clas A Jacobson, and Carl N Nett. Control Oriented System Identification: a Worstcase/deterministic Approach in H1. IEEE Transactions on Automatic control, 36(10):1163-1176, 1991. 13 pages.

Diederik Kingma and Jimmy Ba. Adam: A Method for Stochastic Optimization. In International Conference on Learning Representations (ICLR), 2015, 15 pages.

George EP Box, Gwilym M Jenkins, Gregory C Reinsel, and Greta M Ljung. Time Series Analysis: Forecasting and Control. John Wiley & Sons, 2015, chapters 13-15. 82 pages.

Jie Chen and Guoxiang Gu. Control-oriented System Identification: an H1 Approach, vol. 19. Wiley-Interscience, 2000, chapters 3 & 8, 38 pages.

Jingjuan Dove Feng, Frank Chuang, Francesco Borrelli, and Fred Bauman. Model Predictive Control of Radiant Slab Systems with Evaporative Cooling Sources. Energy and Buildings, 87:199-210, 2015. 11 pages.

K. J. Astrom. Optimal Control of Markov Decision Processes with Incomplete State Estimation. J. Math. Anal. Appl., 10:174-205, 1965.31 pages.

Kelman and F. Borrelli. Bilinear Model Predictive Control of a HVAC System Using Sequential Quadratic Programming. In Proceedings of the 2011 IFAC World Congress, 2011, 6 pages.

Lennart Ljung and Torsten Soderstrom. Theory and practice of recursive identification, vol. 5. JSTOR, 1983, chapters 2, 3 & 7, 80 pages.

Lennart Ljung, editor. System Identification: Theory for the User (2nd Edition). Prentice Hall, Upper Saddle River, New Jersey, 1999, chapters 5 and 7, 40 pages.

Moritz Hardt, Tengyu Ma, and Benjamin Recht. Gradient Descent Learns Linear Dynamical Systems. arXiv preprint arXiv:1609.05191, 2016, 44 pages.

Nevena et al. Data center cooling using model-predictive control, 10 pages.

Sergio Bittanti, Marco C Campi, et al. Adaptive Control of Linear Time Invariant Systems: The "Bet on the Best" Principle. Communications in Information & Systems, 6(4):299-320, 2006. 21 pages.

Yudong Ma, Anthony Kelman, Allan Daly, and Francesco Borrelli. Predictive Control for Energy Efficient Buildings with Thermal Storage: Modeling, Stimulation, and Experiments. IEEE Control Systems, 32(1):44-64, 2012. 20 pages.

Yudong Ma, Francesco Borrelli, Brandon Hencey, Brian Coffey, Sorin Bengea, and Philip Haves. Model Predictive Control for the Operation of Building Cooling Systems. IEEE Transactions on Control Systems Technology, 20(3):796-803, 2012.7 pages.

Extended European Search Report For Application No. 18183902.8, dated Sep. 4, 2018, 9 pages.

U.S. Appl. No. 62/239,245, filed Oct. 8, 2015, Elbsat, et al.
U.S. Appl. No. 15/474,511, filed Mar. 30, 2017, Elbsat, et al.
U.S. Appl. No. 15/644,519, filed Jul. 7, 2017, Johnson Controls Technology Company.
U.S. Appl. No. 15/644,560, filed Jul. 7, 2017, Johnson Controls Technology Company.
U.S. Appl. No. 15/644,581, filed Jul. 7, 2017, Johnson Controls Technology Company.
U.S. Appl. No. 29/611,064, filed Jul. 18, 2017, Johnson Controls Technology Company.
U.S. Appl. No. 29/635,547, filed Jan. 31, 2018, Johnson Controls Technology Company.
U.S. Appl. No. 62/239,131, filed Oct. 8, 2015, Johnson Controls Technology Company.
U.S. Appl. No. 62/239,231, filed Oct. 8, 2015, Johnson Controls Technology Company.
U.S. Appl. No. 62/239,233, filed Oct. 8, 2015, Johnson Controls Technology Company.
U.S. Appl. No. 62/239,246, filed Oct. 8, 2015, Johnson Controls Technology Company.
U.S. Appl. No. 62/239,249, filed Oct. 08, 2015, Johnson Controls Technology Company.
U.S. Appl. No. 62/368,866, filed Jul. 29, 2016, Johnson Controls Technology Company.
U.S. Appl. No. 62/368,869, filed Jul. 29, 2016, Johnson Controls Technology Company.
U.S. Appl. No. 62/368,878, filed Jul. 29, 2016, Johnson Controls Technology Company.
U.S. Appl. No. 62/368,882, filed Jul. 29, 2016, Johnson Controls Technology Company.
U.S. Appl. No. 62/368,888, filed Jul. 29, 2016, Johnson Controls Technology Company.

(56) References Cited

OTHER PUBLICATIONS

U.S. Appl. No. 62/467,426, filed Mar. 6, 2017, Johnson Controls Technology Company.
Etherden et al., "Virtual Power Plant for Grid Services Using IEC 61850," IEEE Transactions on Industrial Informatics, Feb. 2016, vol. 12, No. 1, pp. 437-447.
Office Action on EP 18183902.8, dated Apr. 14, 2021, 6 pages.
Office Action on MX MX/a/2018/008761, dated Jun. 1, 2021, 3 pages.

* cited by examiner

ENERGY STORAGE SYSTEM WITH VIRTUAL DEVICE MANAGER

CROSS-REFERENCE TO RELATED PATENT APPLICATION

This application claims the benefit of and priority to U.S. Provisional Patent Application No. 62/533,539 filed Jul. 17, 2017, the entire disclosure of which is incorporated by reference herein.

BACKGROUND

The present disclosure relates generally to an electrical energy storage system. The present disclosure relates more particularly to an electrical energy storage system with a virtual device manager.

Electrical energy storage (e.g., batteries) can be used for several applications, two of which are ramp rate control and frequency regulation. Ramp rate control is the process of offsetting ramp rates (i.e., increases or decreases in the power output of an energy system such as a photovoltaic energy system) that fall outside of compliance limits determined by the electric power authority overseeing the energy grid. Ramp rate control typically requires the use of an energy source that allows for offsetting ramp rates by either supplying additional power to the grid or consuming more power from the grid. In some instances, a facility is penalized for failing to comply with ramp rate requirements.

Frequency regulation (also referred to as frequency response) is the process of maintaining the grid frequency at a desired value (e.g. 60 Hz in the United States) by adding or removing energy from the grid as needed. During a fluctuation of the grid frequency, a frequency regulation system may offset the fluctuation by either drawing more energy from the energy grid (e.g., if the grid frequency is too high) or by providing energy to the energy grid (e.g., if the grid frequency is too low). A facility participating in a frequency regulation program may receive a regulation signal from a utility or other entity responsible for regulating the frequency of the energy grid. In response to the regulation signal, the facility adds or removes energy from the energy grid. The facility may be provided with monetary incentives or awards in exchange for participating in the frequency regulation program. Storing electrical energy in a battery may allow a facility to perform frequency regulation and/or ramp rate control.

SUMMARY

One implementation of the present disclosure is an energy storage system including a plurality of physical devices and an integration engine. The physical devices include at least a battery and a power inverter operable to charge and discharge the battery. Each of the physical devices stores one or more data points. The integration engine includes a processing circuit having a processor and memory. The memory stores a virtual device network including a plurality of virtual devices and a virtual device manager. Each of the virtual devices includes one or more attributes. The virtual device manager is configured to map the attributes of the virtual devices to corresponding data points stored by the physical devices and update the attributes of the virtual devices in response to detecting changes in value of the corresponding data points stored by the physical devices.

In some embodiments, the energy storage system includes a controller configured to interact with the virtual devices by reading and writing the attributes of the virtual devices. The virtual device manager can be configured to update the data points stored by the physical devices in response to detecting changes in value of corresponding attributes of the virtual devices.

In some embodiments, the energy storage system includes a controller configured to operate the power inverter by writing a power setpoint for the power inverter to a power setpoint attribute of the virtual devices. The virtual device manager can be configured to update a corresponding power setpoint data point stored by the power inverter in response detecting a change in the power setpoint attribute of the virtual devices.

In some embodiments, the plurality of virtual devices include a first virtual device having a first attribute and a second attribute. The plurality of physical devices may include a first physical device storing a first data point and a second physical device storing a second data point. The virtual device manager can be configured to map the first attribute of the first virtual device to the first data point stored by the first physical device and map the second attribute of the first virtual device to the second data point stored by the second physical device.

In some embodiments, the plurality of virtual devices include a first virtual device having a first attribute and a second virtual device having a second attribute. The plurality of physical devices may include a first physical device storing a first data point and a second data point. The virtual device manager can be configured to map the first attribute of the first virtual device to the first data point stored by the first physical device and map the second attribute of the second virtual device to the second data point stored by the first physical device.

In some embodiments, the plurality of virtual devices include a battery container virtual device representing a battery container that contains the plurality of physical devices. In some embodiments, the battery container virtual device includes a set of battery container attributes. A first set of the battery container attributes can be mapped to one or more of the data points stored by a first physical device of the plurality of physical devices. A second set of the battery container attributes can be mapped to one or more of the data points stored by a second physical device of the plurality of physical devices.

In some embodiments, the virtual device manager is configured to calculate a derived data point using one or more of the data points stored by the physical devices and map the derived data point to one or more of the attributes of the virtual devices.

In some embodiments, at least one of the virtual devices represents a control algorithm and comprises attributes includes to inputs and outputs of the control algorithm.

In some embodiments, at least one of the physical devices is a Modbus device and at least one of the virtual devices is a virtual BACnet device. The integration engine may include a data transfer layer configured to provide one or more data points stored by the Modbus device to the virtual device manager. The virtual device manager can be configured to translate the data points stored by the Modbus device into attributes of the virtual BACnet device.

Another implementation of the present disclosure is a method for operating an energy storage system. The method includes operating a plurality of physical devices of the energy storage system. The physical devices include at least a battery and a power inverter that operates to charge and discharge the battery. The method includes storing one or more data points associated with operating the physical devices within the physical devices and generating and storing a virtual device network within an integration engine. The virtual device network includes a plurality of virtual devices and a virtual device manager. Each of the virtual devices includes one or more attributes. The method includes automatically mapping, by the virtual device manager, the attributes of the virtual devices to corresponding data points stored by the physical devices. The method includes updating, by the virtual device manager, the attributes of the virtual devices in response to detecting changes in value of the corresponding data points stored by the physical devices.

In some embodiments, the method includes using a controller to interact with the virtual devices by reading and writing the attributes of the virtual devices and updating the data points stored by the physical devices in response to detecting changes in value of corresponding attributes of the virtual devices.

In some embodiments, the method includes operating the power inverter by writing a power setpoint for the power inverter to a power setpoint attribute of the virtual devices and updating a corresponding power setpoint data point stored by the power inverter in response detecting a change in the power setpoint attribute of the virtual devices.

In some embodiments, the plurality of virtual devices include a first virtual device having a first attribute and a second attribute. The plurality of physical devices may include a first physical device storing a first data point and a second physical device storing a second data point. In some embodiments, mapping the attributes of the virtual devices to corresponding data points stored by the physical devices includes mapping the first attribute of the first virtual device to the first data point stored by the first physical device and mapping the second attribute of the first virtual device to the second data point stored by the second physical device.

In some embodiments, the plurality of virtual devices include a first virtual device having a first attribute and a second virtual device having a second attribute. The plurality of physical devices may include a first physical device storing a first data point and a second data point. In some embodiments, mapping the attributes of the virtual devices to corresponding data points stored by the physical devices includes mapping the first attribute of the first virtual device to the first data point stored by the first physical device and mapping the second attribute of the second virtual device to the second data point stored by the first physical device.

In some embodiments, the plurality of virtual devices include a battery container virtual device representing a battery container that contains the plurality of physical devices. In some embodiments, the battery container virtual device includes a set of battery container attributes. Mapping the attributes of the virtual devices to corresponding data points stored by the physical devices may include mapping a first set of the battery container attributes to one or more of the data points stored by a first physical device of the plurality of physical devices and mapping a second set of the battery container attributes to one or more of the data points stored by a second physical device of the plurality of physical devices.

In some embodiments, the method includes calculating a derived data point using one or more of the data points stored by the physical devices and mapping the derived data point to one or more of the attributes of the virtual devices.

In some embodiments, at least one of the virtual devices represents a control algorithm and comprises includes corresponding to inputs and outputs of the control algorithm.

In some embodiments, at least one of the physical devices is a Modbus device and at least one of the virtual devices is a virtual BACnet device. The method may include providing one or more data points stored by the Modbus device to the virtual device manager via a data transfer layer and translating, by the virtual device manager, the data points stored by the Modbus device into attributes of the virtual BACnet device.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

DETAILED DESCRIPTION

Frequency Response Optimization

Figure 1:
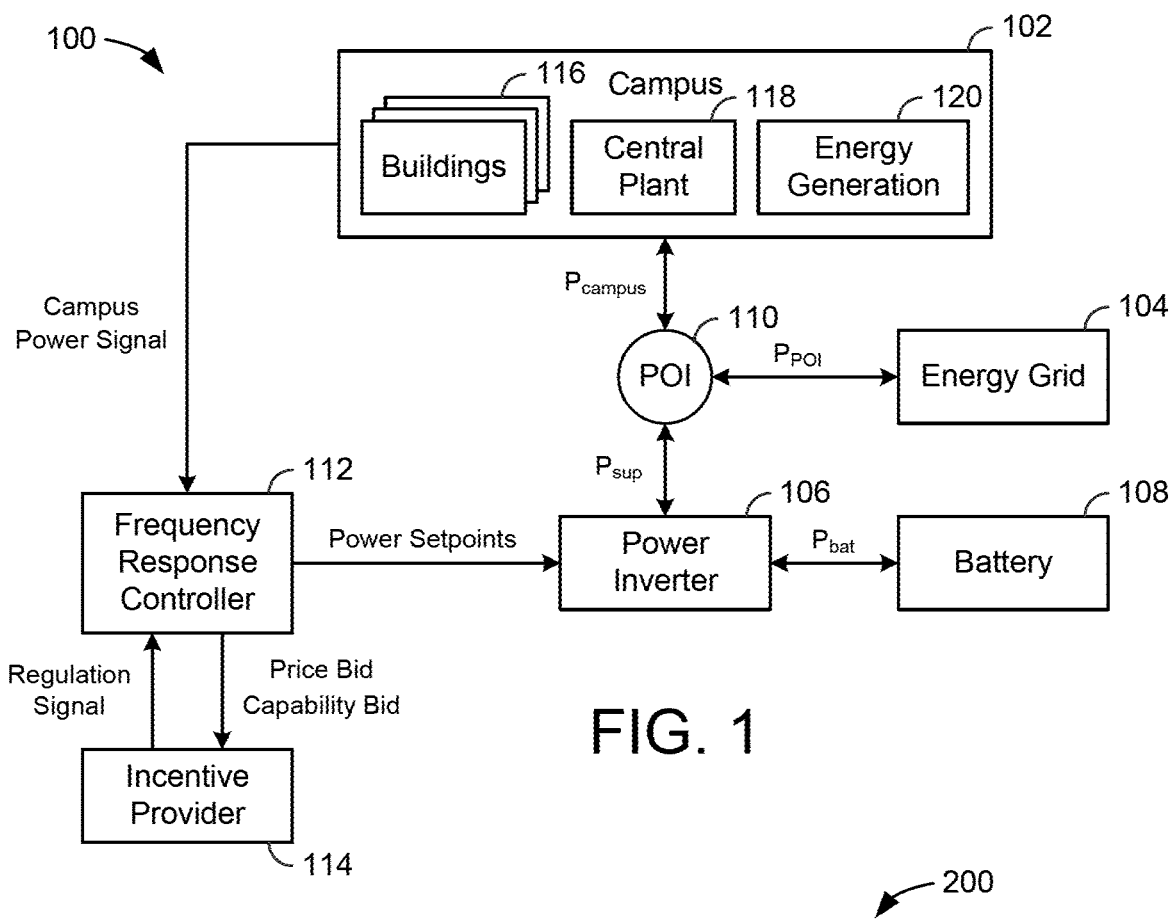
FIG. 1 is a block diagram of a frequency response optimization system, according to an exemplary embodiment.

Referring now to FIG. 1, a frequency response optimization system 100 is shown, according to an exemplary embodiment. System 100 is shown to include a campus 102 and an energy grid 104. Campus 102 may include one or more buildings 116 that receive power from energy grid 104. Buildings 116 may include equipment or devices that consume electricity during operation. For example, buildings 116 may include HVAC equipment, lighting equipment, security equipment, communications equipment, vending machines, computers, electronics, elevators, or other types of building equipment. In some embodiments, buildings 116 are served by a building management system (BMS). A BMS is, in general, a system of devices configured to control, monitor, and manage equipment in or around a building or building area. A BMS can include, for example, a HVAC system, a security system, a lighting system, a fire alerting system, and/or any other system that is capable of managing building functions or devices. An exemplary building management system which may be used to monitor and control buildings 116 is described in U.S. patent application Ser. No. 14/717,593, titled "Building Management System for Forecasting Time Series Values of Building Variables" and filed May 20, 2015, the entire disclosure of which is incorporated by reference herein.

In some embodiments, campus 102 includes a central plant 118. Central plant 118 may include one or more subplants that consume resources from utilities (e.g., water, natural gas, electricity, etc.) to satisfy the loads of buildings 116. For example, central plant 118 may include a heater subplant, a heat recovery chiller subplant, a chiller subplant, a cooling tower subplant, a hot thermal energy storage (TES) subplant, and a cold thermal energy storage (TES) subplant, a steam subplant, and/or any other type of subplant configured to serve buildings 116. The subplants may be configured to convert input resources (e.g., electricity, water, natural gas, etc.) into output resources (e.g., cold water, hot water, chilled air, heated air, etc.) that are provided to buildings 116. An exemplary central plant which may be used to satisfy the loads of buildings 116 is described U.S. patent application Ser. No. 14/634,609, titled "High Level Central Plant Optimization" and filed Feb. 27, 2015, the entire disclosure of which is incorporated by reference herein.

In some embodiments, campus 102 includes energy generation 120. Energy generation 120 may be configured to generate energy that can be used by buildings 116, used by central plant 118, and/or provided to energy grid 104. In some embodiments, energy generation 120 generates electricity. For example, energy generation 120 may include an electric power plant, a photovoltaic energy field, or other types of systems or devices that generate electricity. The electricity generated by energy generation 120 can be used internally by campus 102 (e.g., by buildings 116 and/or campus 118) to decrease the amount of electric power that campus 102 receives from outside sources such as energy grid 104 or battery 108. If the amount of electricity generated by energy generation 120 exceeds the electric power demand of campus 102, the excess electric power can be provided to energy grid 104 or stored in battery 108. The power output of campus 102 is shown in FIG. 1 as $P_{campus}$. $P_{campus}$ may be positive if campus 102 is outputting electric power or negative if campus 102 is receiving electric power.

Still referring to FIG. 1, system 100 is shown to include a power inverter 106 and a battery 108. Power inverter 106 may be configured to convert electric power between direct current (DC) and alternating current (AC). For example, battery 108 may be configured to store and output DC power, whereas energy grid 104 and campus 102 may be configured to consume and generate AC power. Power inverter 106 may be used to convert DC power from battery 108 into a sinusoidal AC output synchronized to the grid frequency of energy grid 104. Power inverter 106 may also be used to convert AC power from campus 102 or energy grid 104 into DC power that can be stored in battery 108. The power output of battery 108 is shown as $P_{bat}$. $P_{bat}$ may be positive if battery 108 is providing power to power inverter 106 or negative if battery 108 is receiving power from power inverter 106.

In some instances, power inverter 106 receives a DC power output from battery 108 and converts the DC power output to an AC power output that can be fed into energy grid 104. Power inverter 106 may synchronize the frequency of the AC power output with that of energy grid 104 (e.g., 50 Hz or 60 Hz) using a local oscillator and may limit the voltage of the AC power output to no higher than the grid voltage. In some embodiments, power inverter 106 is a resonant inverter that includes or uses LC circuits to remove the harmonics from a simple square wave in order to achieve a sine wave matching the frequency of energy grid 104. In various embodiments, power inverter 106 may operate using high-frequency transformers, low-frequency transformers, or without transformers. Low-frequency transformers may convert the DC output from battery 108 directly to the AC output provided to energy grid 104. High-frequency transformers may employ a multi-step process that involves converting the DC output to high-frequency AC, then back to DC, and then finally to the AC output provided to energy grid 104.

System 100 is shown to include a point of interconnection (POI) 110. POI 110 is the point at which campus 102, energy grid 104, and power inverter 106 are electrically connected. The power supplied to POI 110 from power inverter 106 is shown as $P_{sup}$. $P_{sup}$ may be defined as $P_{bat}+P_{loss}$, where $P_{batt}$ is the battery power and $P_{loss}$ is the power loss in the battery system (e.g., losses in power inverter 106 and/or battery 108). $P_{sup}$ may be positive is power inverter 106 is providing power to POI 110 or negative if power inverter 106 is receiving power from POI 110. $P_{campus}$ and $P_{sup}$ combine at POI 110 to form $P_{POI}$. $P_{POI}$ may be defined as the power provided to energy grid 104 from POI 110. $P_{POI}$ may be positive if POI 110 is providing power to energy grid 104 or negative if POI 110 is receiving power from energy grid 104.

Still referring to FIG. 1, system 100 is shown to include a frequency response controller 112. Controller 112 may be configured to generate and provide power setpoints to power inverter 106. Power inverter 106 may use the power setpoints to control the amount of power $P_{sup}$ provided to POI 110 or drawn from POI 110. For example, power inverter 106 may be configured to draw power from POI 110 and store the power in battery 108 in response to receiving a negative power setpoint from controller 112. Conversely, power inverter 106 may be configured to draw power from battery 108 and provide the power to POI 110 in response to receiving a positive power setpoint from controller 112. The magnitude of the power setpoint may define the amount of power $P_{sup}$ provided to or from power inverter 106. Controller 112 may be configured to generate and provide power setpoints that optimize the value of operating system 100 over a time horizon.

In some embodiments, frequency response controller 112 uses power inverter 106 and battery 108 to perform frequency regulation for energy grid 104. Frequency regulation is the process of maintaining the stability of the grid frequency (e.g., 60 Hz in the United States). The grid frequency may remain stable and balanced as long as the total electric supply and demand of energy grid 104 are balanced. Any deviation from that balance may result in a deviation of the grid frequency from its desirable value. For example, an increase in demand may cause the grid frequency to decrease, whereas an increase in supply may cause the grid frequency to increase. Frequency response controller 112 may be configured to offset a fluctuation in the grid frequency by causing power inverter 106 to supply energy from battery 108 to energy grid 104 (e.g., to offset a decrease in grid frequency) or store energy from energy grid 104 in battery 108 (e.g., to offset an increase in grid frequency).

In some embodiments, frequency response controller 112 uses power inverter 106 and battery 108 to perform load shifting for campus 102. For example, controller 112 may cause power inverter 106 to store energy in battery 108 when energy prices are low and retrieve energy from battery 108 when energy prices are high in order to reduce the cost of electricity required to power campus 102. Load shifting may also allow system 100 reduce the demand charge incurred. Demand charge is an additional charge imposed by some utility providers based on the maximum power consumption during an applicable demand charge period. For example, a demand charge rate may be specified in terms of dollars per unit of power (e.g., $/kW) and may be multiplied by the peak power usage (e.g., kW) during a demand charge period to calculate the demand charge. Load shifting may allow system 100 to smooth momentary spikes in the electric demand of campus 102 by drawing energy from battery 108 in order to reduce peak power draw from energy grid 104, thereby decreasing the demand charge incurred.

Still referring to FIG. 1, system 100 is shown to include an incentive provider 114. Incentive provider 114 may be a utility (e.g., an electric utility), a regional transmission organization (RTO), an independent system operator (ISO), or any other entity that provides incentives for performing frequency regulation. For example, incentive provider 114 may provide system 100 with monetary incentives for participating in a frequency response program. In order to participate in the frequency response program, system 100 may maintain a reserve capacity of stored energy (e.g., in battery 108) that can be provided to energy grid 104. System 100 may also maintain the capacity to draw energy from energy grid 104 and store the energy in battery 108. Reserving both of these capacities may be accomplished by managing the state-of-charge of battery 108.

Frequency response controller 112 may provide incentive provider 114 with a price bid and a capability bid. The price bid may include a price per unit power (e.g., $/MW) for reserving or storing power that allows system 100 to participate in a frequency response program offered by incentive provider 114. The price per unit power bid by frequency response controller 112 is referred to herein as the "capability price." The price bid may also include a price for actual performance, referred to herein as the "performance price." The capability bid may define an amount of power (e.g., MW) that system 100 will reserve or store in battery 108 to perform frequency response, referred to herein as the "capability bid."

Incentive provider 114 may provide frequency response controller 112 with a capability clearing price $CP_{cap}$, a performance clearing price $CP_{perf}$, and a regulation award $Reg_{award}$, which correspond to the capability price, the performance price, and the capability bid, respectively. In some embodiments, $CP_{cap}$, $CP_{perf}$, and $Reg_{award}$ are the same as the corresponding bids placed by controller 112. In other embodiments, $CP_{cap}$, $CP_{perf}$, and $Reg_{award}$ may not be the same as the bids placed by controller 112. For example, $CP_{cap}$, $CP_{perf}$, and $Reg_{award}$ may be generated by incentive provider 114 based on bids received from multiple participants in the frequency response program. Controller 112 may use $CP_{cap}$, $CP_{perf}$, and $Reg_{award}$ to perform frequency regulation.

Frequency response controller 112 is shown receiving a regulation signal from incentive provider 114. The regulation signal may specify a portion of the regulation award $Reg_{award}$ that frequency response controller 112 is to add or remove from energy grid 104. In some embodiments, the regulation signal is a normalized signal (e.g., between −1 and 1) specifying a proportion of $Reg_{award}$. Positive values of the regulation signal may indicate an amount of power to add to energy grid 104, whereas negative values of the regulation signal may indicate an amount of power to remove from energy grid 104.

Frequency response controller 112 may respond to the regulation signal by generating an optimal power setpoint for power inverter 106. The optimal power setpoint may take into account both the potential revenue from participating in the frequency response program and the costs of participation. Costs of participation may include, for example, a monetized cost of battery degradation as well as the energy and demand charges that will be incurred. The optimization may be performed using sequential quadratic programming, dynamic programming, or any other optimization technique.

In some embodiments, controller 112 uses a battery life model to quantify and monetize battery degradation as a function of the power setpoints provided to power inverter 106. Advantageously, the battery life model allows controller 112 to perform an optimization that weighs the revenue generation potential of participating in the frequency response program against the cost of battery degradation and other costs of participation (e.g., less battery power available for campus 102, increased electricity costs, etc.). An exemplary regulation signal and power response are described in greater detail with reference to FIG. 2.

Figure 2:
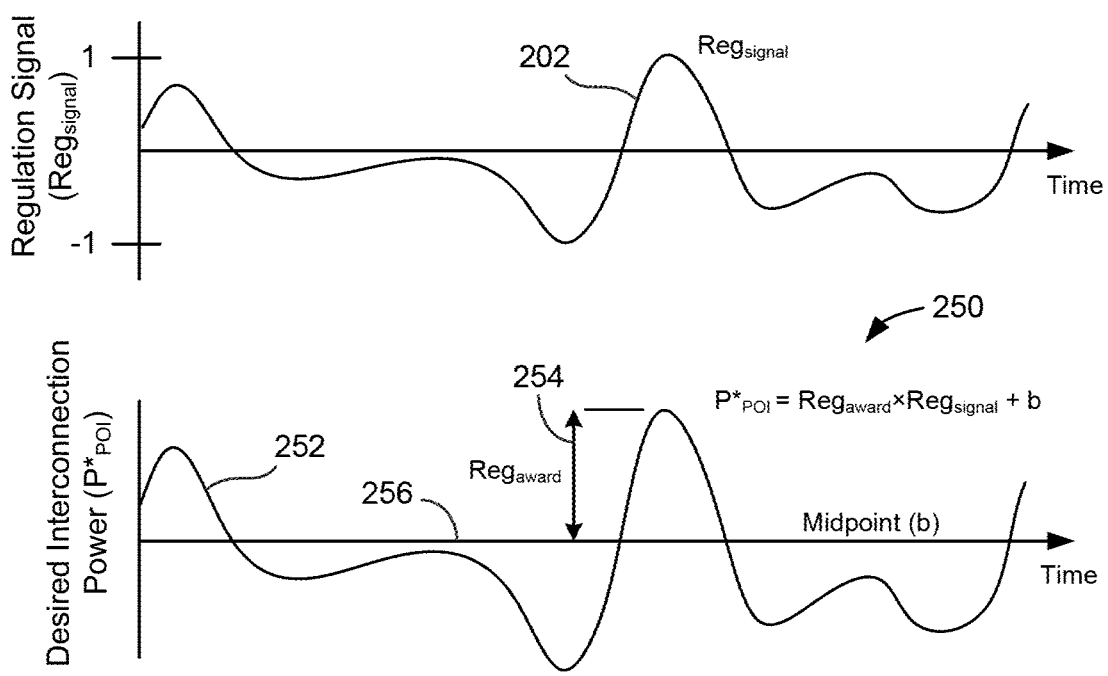
FIG. 2 is a graph of a regulation signal which may be provided to the system of FIG. 1 and a frequency response signal which may be generated by the system of FIG. 1, according to an exemplary embodiment.

Referring now to FIG. 2, a pair of frequency response graphs 200 and 250 are shown, according to an exemplary embodiment. Graph 200 illustrates a regulation signal $Reg_{signal}$ 202 as a function of time. $Reg_{signal}$ 202 is shown as a normalized signal ranging from −1 to 1 (i.e., $-1 \leq Reg_{signal} \leq 1$). $Reg_{signal}$ 202 may be generated by incentive provider 114 and provided to frequency response controller 112. $Reg_{signal}$ 202 may define a proportion of the regulation award $Reg_{award}$ 254 that controller 112 is to add or remove from energy grid 104, relative to a baseline value referred to as the midpoint b 256. For example, if the value of $Reg_{award}$ 254 is 10 MW, a regulation signal value of 0.5 (i.e., $Reg_{signal}=0.5$) may indicate that system 100 is requested to add 5 MW of power at POI 110 relative to midpoint b (e.g., $P_{POI}*=10$ MW×0.5+b), whereas a regulation signal value of −0.3 may indicate that system 100 is requested to remove 3 MW of power from POI 110 relative to midpoint b (e.g., $P_{POI}*=10$ MW×−0.3+b).

Graph 250 illustrates the desired interconnection power $P_{POI}*$ 252 as a function of time. $P_{POI}*$ 252 may be calculated by frequency response controller 112 based on $Reg_{signal}$ 202, $Reg_{award}$ 254, and a midpoint b 256. For example, controller 112 may calculate $P_{POI}*$ 252 using the following equation:

$$P_{POI}* = Reg_{award} \times Reg_{signal} + b$$

where $P_{POI}*$ represents the desired power at POI 110 (e.g., $P_{POI}*=P_{sup}+P_{campus}$) and b is the midpoint. Midpoint b may be defined (e.g., set or optimized) by controller 112 and may represent the midpoint of regulation around which the load is modified in response to $Reg_{signal}$ 202. Optimal adjustment of midpoint b may allow controller 112 to actively participate in the frequency response market while also taking into account the energy and demand charge that will be incurred.

In order to participate in the frequency response market, controller 112 may perform several tasks. Controller 112 may generate a price bid (e.g., $/MW) that includes the capability price and the performance price. In some embodiments, controller 112 sends the price bid to incentive provider 114 at approximately 15:30 each day and the price bid remains in effect for the entirety of the next day. Prior to beginning a frequency response period, controller 112 may generate the capability bid (e.g., MW) and send the capability bid to incentive provider 114. In some embodiments, controller 112 generates and sends the capability bid to incentive provider 114 approximately 1.5 hours before a frequency response period begins. In an exemplary embodiment, each frequency response period has a duration of one hour; however, it is contemplated that frequency response periods may have any duration.

At the start of each frequency response period, controller 112 may generate the midpoint b around which controller 112 plans to perform frequency regulation. In some embodiments, controller 112 generates a midpoint b that will maintain battery 108 at a constant state-of-charge (SOC) (i.e. a midpoint that will result in battery 108 having the same SOC at the beginning and end of the frequency response period). In other embodiments, controller 112 generates midpoint b using an optimization procedure that allows the SOC of battery 108 to have different values at the beginning and end of the frequency response period. For example, controller 112 may use the SOC of battery 108 as a constrained variable that depends on midpoint b in order to optimize a value function that takes into account frequency response revenue, energy costs, and the cost of battery degradation. Exemplary processes for calculating and/or optimizing midpoint b under both the constant SOC scenario and the variable SOC scenario are described in detail in U.S. Provisional Patent Application No. 62/239,246 filed Oct. 8, 2015, the entire disclosure of which is incorporated by reference herein.

During each frequency response period, controller 112 may periodically generate a power setpoint for power inverter 106. For example, controller 112 may generate a power setpoint for each time step in the frequency response period. In some embodiments, controller 112 generates the power setpoints using the equation:

$$P_{POI}^* = Reg_{award} \times Reg_{signal} + b$$

where $P_{POI}^* = P_{sup} + P_{campus}$. Positive values of $P_{POI}^*$ indicate energy flow from POI 110 to energy grid 104. Positive values of $P_{sup}$ and $P_{campus}$ indicate energy flow to POI 110 from power inverter 106 and campus 102, respectively. In other embodiments, controller 112 generates the power setpoints using the equation:

$$P_{POI}^* = Reg_{award} \times Res_{FR} + b$$

where $Res_{FR}$ is an optimal frequency response generated by optimizing a value function. Controller 112 may subtract $P_{campus}$ from $P_{POI}^*$ to generate the power setpoint for power inverter 106 (i.e., $P_{sup} = P_{POI}^* - P_{campus}$). The power setpoint for power inverter 106 indicates the amount of power that power inverter 106 is to add to POI 110 (if the power setpoint is positive) or remove from POI 110 (if the power setpoint is negative). Exemplary processes for calculating power inverter setpoints are described in detail in U.S. Provisional Patent Application No. 62/239,246.

Photovoltaic Energy System with Frequency Regulation and Ramp Rate Control

Figure 3:
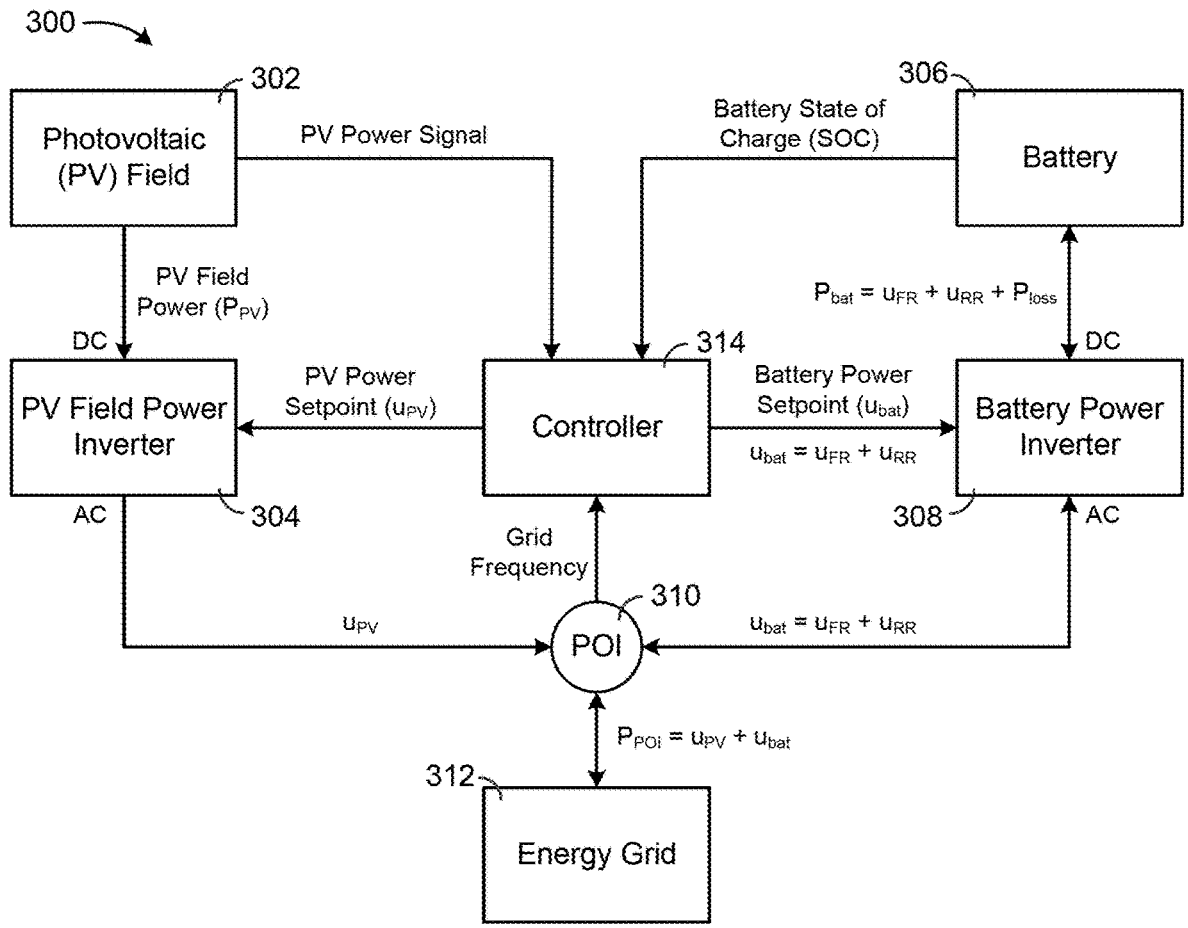
FIG. 3 is a block diagram of a photovoltaic energy system configured to simultaneously perform both ramp rate control and frequency regulation while maintaining the state-of-charge of a battery within a desired range, according to an exemplary embodiment.
Figure 4:
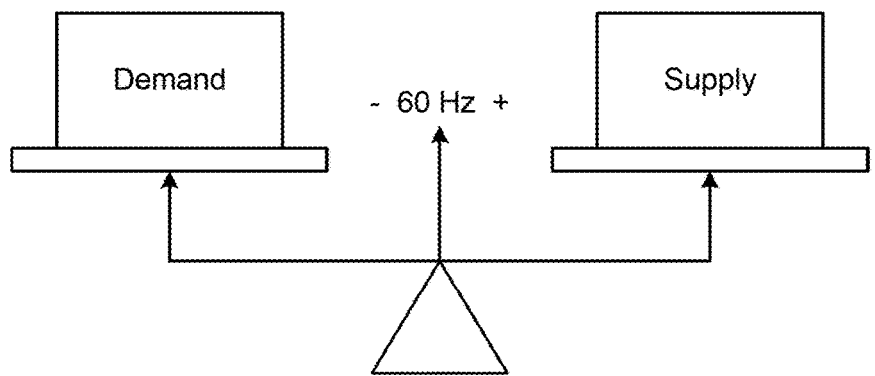
FIG. 4 is a drawing illustrating the electric supply to an energy grid and electric demand from the energy grid which must be balanced in order to maintain the grid frequency, according to an exemplary embodiment.

Referring now to FIGS. 3-4, a photovoltaic energy system 300 that uses battery storage to simultaneously perform both ramp rate control and frequency regulation is shown, according to an exemplary embodiment. Ramp rate control is the process of offsetting ramp rates (i.e., increases or decreases in the power output of an energy system such as a photovoltaic energy system) that fall outside of compliance limits determined by the electric power authority overseeing the energy grid. Ramp rate control typically requires the use of an energy source that allows for offsetting ramp rates by either supplying additional power to the grid or consuming more power from the grid. In some instances, a facility is penalized for failing to comply with ramp rate requirements.

Frequency regulation is the process of maintaining the stability of the grid frequency (e.g., 60 Hz in the United States). As shown in FIG. 4, the grid frequency may remain balanced at 60 Hz as long as there is a balance between the demand from the energy grid and the supply to the energy grid. An increase in demand yields a decrease in grid frequency, whereas an increase in supply yields an increase in grid frequency. During a fluctuation of the grid frequency, system 300 may offset the fluctuation by either drawing more energy from the energy grid (e.g., if the grid frequency is too high) or by providing energy to the energy grid (e.g., if the grid frequency is too low). Advantageously, system 300 may use battery storage in combination with photovoltaic power to perform frequency regulation while simultaneously complying with ramp rate requirements and maintaining the state-of-charge of the battery storage within a predetermined desirable range.

Referring particularly to FIG. 3, system 300 is shown to include a photovoltaic (PV) field 302, a PV field power inverter 304, a battery 306, a battery power inverter 308, a point of interconnection (POI) 310, and an energy grid 312. PV field 302 may include a collection of photovoltaic cells. The photovoltaic cells are configured to convert solar energy (i.e., sunlight) into electricity using a photovoltaic material such as monocrystalline silicon, polycrystalline silicon, amorphous silicon, cadmium telluride, copper indium gallium selenide/sulfide, or other materials that exhibit the photovoltaic effect. In some embodiments, the photovoltaic cells are contained within packaged assemblies that form solar panels. Each solar panel may include a plurality of linked photovoltaic cells. The solar panels may combine to form a photovoltaic array.

PV field 302 may have any of a variety of sizes and/or locations. In some embodiments, PV field 302 is part of a large-scale photovoltaic power station (e.g., a solar park or farm) capable of providing an energy supply to a large number of consumers. When implemented as part of a large-scale system, PV field 302 may cover multiple hectares and may have power outputs of tens or hundreds of megawatts. In other embodiments, PV field 302 may cover a smaller area and may have a relatively lesser power output (e.g., between one and ten megawatts, less than one megawatt, etc.). For example, PV field 302 may be part of a rooftop-mounted system capable of providing enough electricity to power a single home or building. It is contemplated that PV field 302 may have any size, scale, and/or power output, as may be desirable in different implementations.

PV field 302 may generate a direct current (DC) output that depends on the intensity and/or directness of the sunlight to which the solar panels are exposed. The directness of the sunlight may depend on the angle of incidence of the sunlight relative to the surfaces of the solar panels. The intensity of the sunlight may be affected by a variety of environmental factors such as the time of day (e.g., sunrises and sunsets) and weather variables such as clouds that cast shadows upon PV field 302. When PV field 302 is partially or completely covered by shadow, the power output of PV field 302 (i.e., PV field power $P_{PV}$) may drop as a result of the decrease in solar intensity.

In some embodiments, PV field 302 is configured to maximize solar energy collection. For example, PV field 302 may include a solar tracker (e.g., a GPS tracker, a sunlight sensor, etc.) that adjusts the angle of the solar panels so that the solar panels are aimed directly at the sun throughout the day. The solar tracker may allow the solar panels to receive direct sunlight for a greater portion of the day and may increase the total amount of power produced by PV field 302. In some embodiments, PV field 302 includes a collection of mirrors, lenses, or solar concentrators configured to direct and/or concentrate sunlight on the solar panels. The energy generated by PV field 302 may be stored in battery 306 or provided to energy grid 312.

Still referring to FIG. 3, system 300 is shown to include a PV field power inverter 304. Power inverter 304 may be configured to convert the DC output of PV field 302 $P_{PV}$ into an alternating current (AC) output that can be fed into energy grid 312 or used by a local (e.g., off-grid) electrical network. For example, power inverter 304 may be a solar inverter or grid-tie inverter configured to convert the DC output from PV field 302 into a sinusoidal AC output synchronized to the grid frequency of energy grid 312. In some embodiments, power inverter 304 receives a cumulative DC output from PV field 302. For example, power inverter 304 may be a string inverter or a central inverter. In other embodiments, power inverter 304 may include a collection of micro-inverters connected to each solar panel or solar cell. PV field power inverter 304 may convert the DC power output $P_{PV}$ into an AC power output $u_{PV}$ and provide the AC power output $u_{PV}$ to POI 310.

Power inverter 304 may receive the DC power output $P_{PV}$ from PV field 302 and convert the DC power output to an AC power output that can be fed into energy grid 312. Power inverter 304 may synchronize the frequency of the AC power output with that of energy grid 312 (e.g., 50 Hz or 60 Hz) using a local oscillator and may limit the voltage of the AC power output to no higher than the grid voltage. In some embodiments, power inverter 304 is a resonant inverter that includes or uses LC circuits to remove the harmonics from a simple square wave in order to achieve a sine wave matching the frequency of energy grid 312. In various embodiments, power inverter 304 may operate using high-frequency transformers, low-frequency transformers, or without transformers. Low-frequency transformers may convert the DC output from PV field 302 directly to the AC output provided to energy grid 312. High-frequency transformers may employ a multi-step process that involves converting the DC output to high-frequency AC, then back to DC, and then finally to the AC output provided to energy grid 312.

Power inverter 304 may be configured to perform maximum power point tracking and/or anti-islanding. Maximum power point tracking may allow power inverter 304 to produce the maximum possible AC power from PV field 302. For example, power inverter 304 may sample the DC power output from PV field 302 and apply a variable resistance to find the optimum maximum power point. Anti-islanding is a protection mechanism that immediately shuts down power inverter 304 (i.e., preventing power inverter 304 from generating AC power) when the connection to an electricity-consuming load no longer exists. In some embodiments, PV field power inverter 304 performs ramp rate control by limiting the power generated by PV field 302.

Still referring to FIG. 3, system 300 is shown to include a battery power inverter 308. Battery power inverter 308 may be configured to draw a DC power $P_{bat}$ from battery 306, convert the DC power $P_{bat}$ into an AC power $u_{bat}$, and provide the AC power $u_{bat}$ to POI 310. Battery power inverter 308 may also be configured to draw the AC power $u_{bat}$ from POI 310, convert the AC power $u_{bat}$ into a DC battery power $P_{bat}$, and store the DC battery power $P_{bat}$ in battery 306. The DC battery power $P_{bat}$ may be positive if battery 306 is providing power to battery power inverter 308 (i.e., if battery 306 is discharging) or negative if battery 306 is receiving power from battery power inverter 308 (i.e., if battery 306 is charging). Similarly, the AC battery power $u_{bat}$ may be positive if battery power inverter 308 is providing power to POI 310 or negative if battery power inverter 308 is receiving power from POI 310.

The AC battery power $u_{bat}$ is shown to include an amount of power used for frequency regulation (i.e., $u_{FR}$) and an amount of power used for ramp rate control (i.e., $u_{RR}$) which together form the AC battery power (i.e., $u_{bat}=u_{FR}+u_{RR}$). The DC battery power $P_{bat}$ is shown to include both $u_{FR}$ and $u_{RR}$ as well as an additional term $P_{loss}$ representing power losses in battery 306 and/or battery power inverter 308 (i.e., $P_{bat}=u_{FR}+u_{RR}+P_{loss}$). The PV field power $u_{PV}$ and the battery power $u_{bat}$ combine at POI 110 to form $P_{POI}$ (i.e., $P_{POI}=u_{PV}+u_{bat}$), which represents the amount of power provided to energy grid 312. $P_{POI}$ may be positive if POI 310 is providing power to energy grid 312 or negative if POI 310 is receiving power from energy grid 312.

Still referring to FIG. 3, system 300 is shown to include a controller 314. Controller 314 may be configured to generate a PV power setpoint $u_{PV}$ for PV field power inverter 304 and a battery power setpoint $u_{bat}$ for battery power inverter 308. Throughout this disclosure, the variable $u_{PV}$ is used to refer to both the PV power setpoint generated by controller 314 and the AC power output of PV field power inverter 304 since both quantities have the same value. Similarly, the variable $u_{bat}$ is used to refer to both the battery power setpoint generated by controller 314 and the AC power output/input of battery power inverter 308 since both quantities have the same value.

PV field power inverter 304 uses the PV power setpoint $u_{PV}$ to control an amount of the PV field power $P_{PV}$ to provide to POI 110. The magnitude of $u_{PV}$ may be the same as the magnitude of $P_{PV}$ or less than the magnitude of $P_{PV}$. For example, $u_{PV}$ may be the same as $P_{PV}$ if controller 314 determines that PV field power inverter 304 is to provide all of the photovoltaic power $P_{PV}$ to POI 310. However, $u_{PV}$ may be less than $P_{PV}$ if controller 314 determines that PV field power inverter 304 is to provide less than all of the photovoltaic power $P_{PV}$ to POI 310. For example, controller 314 may determine that it is desirable for PV field power inverter 304 to provide less than all of the photovoltaic power $P_{PV}$ to POI 310 to prevent the ramp rate from being exceeded and/or to prevent the power at POI 310 from exceeding a power limit.

Battery power inverter 308 uses the battery power setpoint $u_{bat}$ to control an amount of power charged or discharged by battery 306. The battery power setpoint $u_{bat}$ may be positive if controller 314 determines that battery power inverter 308 is to draw power from battery 306 or negative if controller 314 determines that battery power inverter 308 is to store power in battery 306. The magnitude of $u_{bat}$ controls the rate at which energy is charged or discharged by battery 306.

Controller 314 may generate $u_{PV}$ and $u_{bat}$ based on a variety of different variables including, for example, a power signal from PV field 302 (e.g., current and previous values for $P_{PV}$), the current state-of-charge (SOC) of battery 306, a maximum battery power limit, a maximum power limit at POI 310, the ramp rate limit, the grid frequency of energy grid 312, and/or other variables that can be used by controller 314 to perform ramp rate control and/or frequency regulation. Advantageously, controller 314 generates values for $u_{PV}$ and $u_{bat}$ that maintain the ramp rate of the PV power within the ramp rate compliance limit while participating in the regulation of grid frequency and maintaining the SOC of battery 306 within a predetermined desirable range. An exemplary controller which can be used as controller 314 and exemplary processes which may be performed by controller 314 to generate the PV power setpoint $u_{PV}$ and the battery power setpoint $u_{bat}$ are described in detail in U.S. Provisional Patent Application No. 62/239,245 filed Oct. 8, 2015, the entire disclosure of which is incorporated by reference herein.

Electrical Energy Storage System with Virtual Device Manager

Figure 5:
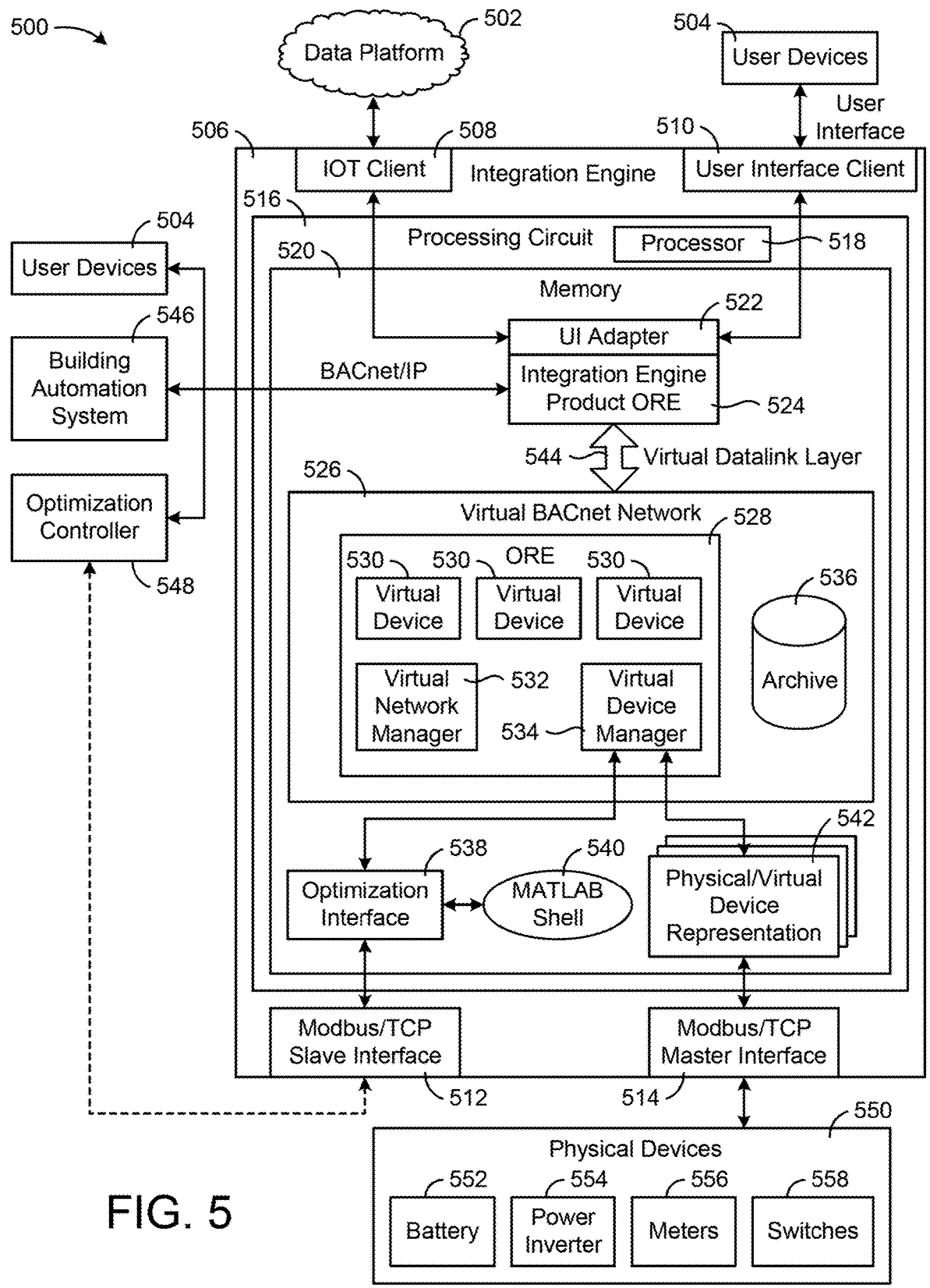
FIG. 5 is a block diagram of an energy storage system including an integration engine configured to generate and maintain virtual devices, according to an exemplary embodiment.

Referring now to FIG. 5, an electrical energy storage system 500 is shown, according to an exemplary embodiment. System 500 can be configured to use batteries and other assets to reduce the cost of electrical energy for a facility. System 500 can be implemented as part of a frequency response optimization system (e.g., system 100), a photovoltaic energy system (e.g., system 300), a ramp rate control system, a building automation system, or any other system that stores electrical energy in batteries. Several examples of systems in which electrical energy storage system 500 can be implemented are described in detail in U.S. Provisional Patent Applications Nos. 62/239,131, 62/239,231, 62/239,233, 62/239,245, 62/239,246, and 62/239,249. All of these applications have a filing date of Oct. 8, 2015, and are incorporated by reference herein.

System 500 is shown to include physical devices 550, an optimization controller 548, a data platform 502, user devices 504, a building automation system (BAS) 546, and an integration engine 506. Physical devices 550 can include any physical equipment or devices in energy storage system 500. For example, physical devices 550 are shown to include a battery 552, a power inverter 554, meters 556, and switches 558. Physical devices 550 can include any of the equipment of frequency response optimization system 100, photovoltaic energy system 300, or other equipment configured for use in an electrical energy storage system. Physical devices 550 can include various sensors, actuators, controllable devices, and/or other equipment configured to monitor and control the storage and discharge of electrical energy from batteries. Physical devices 550 can be configured to communicate using any of a variety of communications protocols such as BACnet/IP and Modbus/TCP.

Controller 548 can be configured to monitor and control system 500. For example, controller 548 can receive measurements from meters 556 and/or other input from physical devices 550. Controller 548 can provide control signals to power inverter 554 and switches 558 to control the rate at which electrical energy is stored in battery 552 or discharged from battery 552. Controller 548 can be configured to perform any of the functions described in U.S. Provisional Patent Applications Nos. 62/239,131, 62/239,231, 62/239, 233, 62/239,245, 62/239,246, and 62/239,249. For example, controller 548 can operate power inverter 554 to perform frequency regulation, ramp rate control, electric load shifting, or any other activity which uses electrical energy storage. In some embodiments, controller 548 is configured to communicate using the BACnet/IP protocol. However, it is contemplated that controller 548 may also communicate using the Modbus/TCP protocol in some embodiments.

Data platform 502 can include various data storage and processing components configured to receive the data generated by physical devices 550, controller 548, and other components of system 500. In some embodiments, data platform 502 is a cloud-based platform that communicates with integration engine 506 via a communications network (e.g., the Internet). Several examples of a data platform which can be used as data platform 502 are described in detail in U.S. patent application Ser. Nos. 15/644,519, 15/644,560, and 15/644,581. Each of these patent applications has a filing date of Jul. 7, 2017, and is incorporated by reference herein in its entirety. Data platform 502 can be configured to receive data from integration engine 506 via an Internet of Things (IOT) client 508.

User devices 504 can include any of a variety of devices that facilitate user interaction with integration engine 506, optimization controller 548, and/or physical devices 550. For example, user devices 504 can include desktop computers, laptop computers, tablets, smartphones, computer workstations, control panels, or other user-operable devices. User devices 504 can be configured to receive input from a user and provide the input to integration engine 506 via a user interface client 510. Similarly, user devices 504 can be configured to provide input to integration engine via user interface client 510. In some embodiments, user devices 504 can communicate with integration engine product ORE 524 via BACnet/IP.

BAS 546 can be configured to monitor and control a facility (e.g., campus 102) that receives electricity from electrical energy storage system 500. A BAS is, in general, a system of devices configured to control, monitor, and manage equipment in or around a building or building area. A BAS can include, for example, a HVAC system, a security system, a lighting system, a fire alerting system, any other system that is capable of managing building functions or devices, or any combination thereof. In some embodiments, BAS 546 is a METASYS® brand building automation system or VERASYS® brand building automation system. BAS 546 can be configured to communicate with integration engine 506 using BACnet/IP.

Integration engine 506 serves several roles in system 500. For example, integration engine 506 can serve as an integrator between physical devices 550, data platform 502, user devices 504, BAS 546, and optimization controller 548. In some embodiments, integration engine 506 communicates with physical devices 550 using BACnet/IP or a non-BACnet communications protocol such as Modbus/TCP. Integration engine 506 can use the data from physical devices 550 to generate and update various virtual BACnet devices 530. Integration engine 506 can use virtual BACnet devices 530 to present the data from physical devices 550 to BAS 546, optimization controller 548, data platform 502, and user devices 504. In some embodiments, integration engine 506 is configured to perform operations on the data by hosting a Matlab application 540. The inputs and outputs of Matlab application 540 can also be represented as a virtual BACnet device.

Still referring to FIG. 5, integration engine 506 is shown to include various communications interfaces (e.g., IOT client 508, user interface client 510, Modbus/TCP slave interface 512, and Modbus TCP master interface 514) and a processing circuit 516. The communications interfaces may include wired or wireless interfaces (e.g., jacks, antennas, transmitters, receivers, transceivers, wire terminals, etc.) for conducting data communications with various systems, devices, or networks. For example, the communications interfaces may include an Ethernet card and port for sending and receiving data via an Ethernet-based communications network and/or a Wi-Fi transceiver for communicating via a wireless communications network. The communications interfaces may be configured to communicate via local area networks or wide area networks (e.g., the Internet, a building WAN, etc.) and may use a variety of communications protocols (e.g., BACnet/IP Modbus/TCP, IP, LON, etc.).

The communications interfaces may be configured to facilitate electronic data communications between integration engine 506 and various external systems or devices (e.g., data platform 502, user devices 504, BAS 546, controller 548, physical devices 550, etc.). For example, integration engine 506 can send data to data platform 502 via IOT client 508. Integration engine 506 can communicate with user devices 504 via user interface client 510. Integration engine 506 can communicate with optimization controller 548 via Modbus/TCP slave interface 512. Integration engine 506 can communicate with physical devices 550 via Modbus/TCP master interface 514.

Processing circuit 516 is shown to include a processor 518 and memory 520. Processor 518 may be a general purpose or specific purpose processor, an application specific integrated circuit (ASIC), one or more field programmable gate arrays (FPGAs), a group of processing components, or other suitable processing components. Processor 518 may be configured to execute computer code or instructions stored in memory 520 or received from other computer readable media (e.g., CDROM, network storage, a remote server, etc.).

Memory 520 may include one or more devices (e.g., memory units, memory devices, storage devices, etc.) for storing data and/or computer code for completing and/or facilitating the various processes described in the present disclosure. Memory 520 may include random access memory (RAM), read-only memory (ROM), hard drive storage, temporary storage, non-volatile memory, flash memory, optical memory, or any other suitable memory for storing software objects and/or computer instructions. Memory 520 may include database components, object code components, script components, or any other type of information structure for supporting the various activities and information structures described in the present disclosure. Memory 520 may be communicably connected to processor 518 via processing circuit 516 and may include computer code for executing (e.g., by processor 518) one or more processes described herein.

Still referring to FIG. 5, integration engine 506 is shown to include a user interface (UI) adapter 522 and an integration engine product object runtime environment (ORE) 524. UI adapter 522 can be configured to facilitate communications via IOT client 508 and user interface client 510. Similarly, integration engine product ORE 524 can be configured to facilitate communications with BAS 546 and optimization controller 548 via BACnet/IP. In some embodiments, UI adapter 522 determines which system data can be used for various conditions. For example, UI adapter 522 may include an interlock I/O handler component, an interlock summary handler component, and an interlock configuration handler component. The interlock I/O handler component can provide a list of possible inputs for use in interlock conditions, and a list of currently non-interlocked points (e.g., points that are not controlled by any other interlocks. Inputs for the interlock may include the present value of any point as well as various data from physical devices 550. The interlock summary handler component may provide a list of interlock objects along with their configurations. The interlock configuration handler component may allow a client to create a new interlock object and edit an interlock object's configuration.

Integration engine 506 is shown to include a virtual BACnet network 526. Virtual BACnet network 526 may communicate with integration engine product ORE 524 via a virtual datalink layer 544. Virtual BACnet network 526 is shown to include an object runtime environment (ORE) 528 that include various virtual devices 530, a virtual network manager 532, and a virtual device manager 534. Virtual devices 530 can serve as a virtual representation of one or more physical devices 550. For example, each of virtual devices 530 may be a data object that includes a plurality of attributes. Each attribute of a virtual device 530 can be mapped to a data point of physical devices 550 (e.g., a power measurement, a temperature reading, a setpoint, etc.) such that all the relevant data points of physical devices 550 are represented by virtual devices 530.

The data from each of physical devices 550 can be received via Modbus/TCP master interface 514 and translated into physical/virtual device representation 542. The physical/virtual device representations 542 can be accessed by virtual device manager 534 and used to create virtual devices 530. In some embodiments, integration engine 506 receives data from controller 548 via Modbus/TCP slave interface 512. The data from controller 548 can be processed by optimization interface 538 and passed to virtual device manager 534. The data from controller 548 can be accessed by virtual device manager 534 and used to create virtual devices 530.

In some embodiments, virtual devices 530 are the devices seen by BAS 546, optimization controller 548, data platform 502, and user devices 504. For example, BAS 546 and optimization controller 548 can be configured to read and write values to virtual devices 530 as a means of interacting with physical devices 550. Similarly, data platform 502 and user devices 504 can be configured to read values from virtual devices 530. The attributes of virtual devices 530 can be linked to the data points of physical devices (e.g., measurements, setpoints, configuration parameters, operating parameters, etc.) such that a change in value of a data point of physical devices 550 causes a corresponding change in the value of any attributes of virtual devices 530 that are linked to the data point. For example, a data point of power inverter 554 may represent the current power output of power inverter 554. As the power output changes, the value of the power output data point may change as well. The power output data point may be mapped to one or more attributes of virtual devices 530. In response to a change in value of the power output data point, the values of the attributes mapped to the power output data point may be updated by virtual device manager 534 to reflect the current value of the power output data point.

Similarly, changes in one or more attributes of virtual devices 530 may cause corresponding changes in the value of any data points of physical devices 550 that are linked to the changed attributes of virtual devices 530. For example, one attribute of virtual devices 530 may represent a power setpoint for power inverter 554. A change in the power setpoint can be written to the attribute of virtual devices 530 (e.g., by optimization controller 548). The power setpoint attribute of virtual devices 530 may be mapped to a power setpoint (i.e., a type of data point) of power inverter 554. In response to a change in value of the power setpoint attribute of virtual devices 530, the value of the power setpoint of power inverter 554 may be updated by virtual device manager 534 to reflect the current value of the power setpoint attribute.

Virtual device manager 534 can be configured to create virtual devices 530 according to a configuration file that determines characteristics such as device and point object identifiers, name, description, and source device. The settings for the integrations (such as Modbus) can also be determined by a configuration file. In some embodiments, the configuration file is uploaded to integration engine 506 and stored in memory 520 (e.g., in archive 536).

There are several advantages to using this virtual device approach for system 500. For example, the presentation of data from physical devices 550 to BAS 546 and controller 548 is configurable without recompilation. In some embodiments, each virtual device 530 can be created using data from one of physical devices 550 (e.g., a single meter, a single power inverter, etc.). In some embodiments, one or more of virtual devices 530 is created using data points from several different physical devices 550. In other words, one or more of virtual devices 530 may include a plurality of attributes that are mapped to data points from several different physical devices 550. For example, a "battery container" virtual device 530 can include attributes mapped to data points of power inverter 554, meters 556, battery 552, and/or physical switches 558. One or more of the attributes of the battery container virtual device 530 may be mapped to data points of power inverter 554, whereas one or more other attributes of the battery container virtual device 530 may be mapped to data points of meters 556, battery 552, and/or physical switches 558.

Similarly, one or more of physical devices 550 may include data points that are mapped to attributes of several different virtual devices 530. For example, some data points of a physical device 550 may be mapped to attributes of a first virtual device 530, whereas other data points of the same physical device 550 may be mapped to attributes of a second virtual device 530. In this way, multiple virtual devices 530 may be created to represent a single physical device 550. As another example, the same data point of a physical device 550 can be mapped to multiple attributes distributed across multiple virtual devices. In other words, two or more of virtual devices 530 may include an attribute mapped to the same data point of physical devices 550. Advantageously, the data points provided by physical devices 550 can be grouped as desired and mapped to any combination of virtual devices 530. A one-to-one mapping of virtual devices 530 to physical devices 550 is not required. Rather, virtual devices 530 can be created to organize and represent the data points provided by physical devices 550 according to any desired abstraction or representation of physical devices 550.

Data derived within integration engine 506 can also be represented as part of a virtual device profile. Virtual device manager 534 can be configured to calculate the values of various derived data points based on the values of data points provide by physical devices 550 and/or other types of input data. For example, threshold based alarms can be defined. For specific analog points, values outside of a given range can be represented clearly as a high/low binary alarm points. The data to create these alarm points (e.g., limits, alarm point object identifiers, etc.) can be part of the virtual device configuration file. In some embodiments, the derived data points are stored within integration engine 506. Like the data points provided by physical devices 550, the derived data points can be mapped to attributes of virtual devices 530 (e.g., by virtual device manager 534).

Settings for communicating with physical devices 550 (e.g., communications protocols such as Modbus) are also configurable without rebuilding the firmware. Combined with the flexibility of virtual devices 530, this allows for a consistent data interface even though physical devices 550 may be from different vendors or have varying capabilities.

Representing Matlab algorithm 540 as a virtual device access to the algorithm provides a consistent, flexible interface to BAS 546, controller 548, and data platform 502. Like the other virtual devices 530, mapping between data sources and consumers can be made without rebuilding the source code.

Interface Between Physical Devices and Virtual Device Manager

This section describes the design of the Modbus/TCP master interface 514. Although a Modbus/TCP master interface is described, it is contemplated that any of a variety of interfaces can be provided to communicate with physical devices 550 that use various communications protocols. Accordingly, the Modbus/TCP master interface 514 can be replaced or supplemented with another interface that facilitates communications with physical devices that communicate using a non-Modbus communications protocol.

Figure 6:
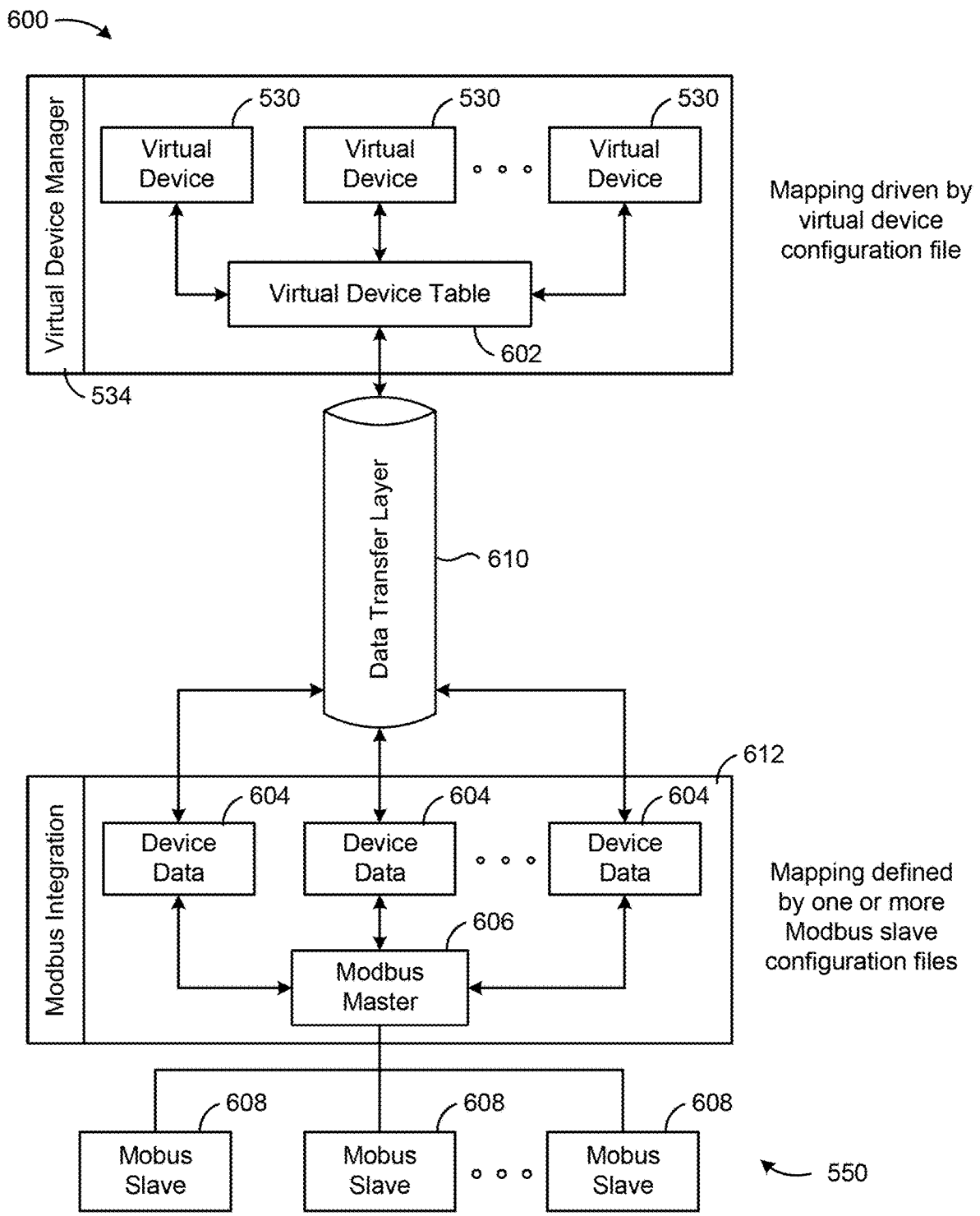
FIG. 6 is a block diagram illustrating an interface between physical devices and a virtual device manager in the system of FIG. 5, according to an exemplary embodiment.

Referring now to FIG. 6, a block diagram 600 illustrating the interface between physical devices 550 and virtual device manager 534 is shown, according to an exemplary embodiment. The bottom layer is shown to include several Modbus slave devices 608 (e.g., physical devices 550). Modbus slave devices 608 may be managed by a Modbus master device 606 which collects device data 604 from each Modbus slave device 608 and provides device data 604 to a data transfer layer 610. In some embodiments, data transfer layer 610 is a component of integration engine 506. Data transfer layer 610 may provide the device data 604 (e.g., the data points stored by physical devices 550) to virtual device manager 534, which uses a virtual device table 602 to map the device data 604 to one or more virtual devices 530 (e.g., virtual BACnet devices).

At the Modbus master device 606, there may be one or more configuration files to define the device register mappings for each Modbus slave device 608. For each slave device 608, the configuration file may specify the Modbus/TCP address and maximum scan rate for the slave device 608. For each data point in a slave device 608, the configuration file may specify the data type (e.g., binary, int, float), the scan frequency of the point relative to the device, and identifying information sufficient for the rest of the system to map to the data points, independent of their Modbus/TCP address and register location.

Virtual devices 530 and their point mappings to the data from the Modbus master device 606 can be defined by another configuration file. As noted previously, virtual devices 530 are not necessarily one-to-one mappings of Modbus slave devices 608. Data from a single Modbus slave device 608 may be consumed by several different virtual devices 530. Similarly, data presented by one virtual device 530 may come from several different Modbus slave devices 608, or it might be data derived within integration engine 506.

Data can be exchanged between device data 604 in the Modbus driver 612 and the virtual device data in virtual devices 530 via a data transfer layer 610 as points are changed by either side. In some embodiments, once the initial data is exchanged only changed data may transferred by data transfer layer 610.

In some embodiments, data values are stored within integration engine as timeseries and are made available for forwarding to data platform 502, user devices 504, BAS 546, and controller 548 as timeseries. Several examples of timeseries storage techniques which can be used by integration engine 506 are described in detail in U.S. patent application Ser. Nos. 15/644,519, 15/644,560, and 15/644,581. For all values a minimum storage interval can be specified. The minimum storage interval may specify the minimum amount of time that can elapse between consecutive samples of a timeseries. For analog values an additional value change threshold for storing a new sample can be defined. If the analog value changes by more than the threshold, a new data sample representing the changed analog value can be created and stored.

Graphical User Interface

Figure 7:
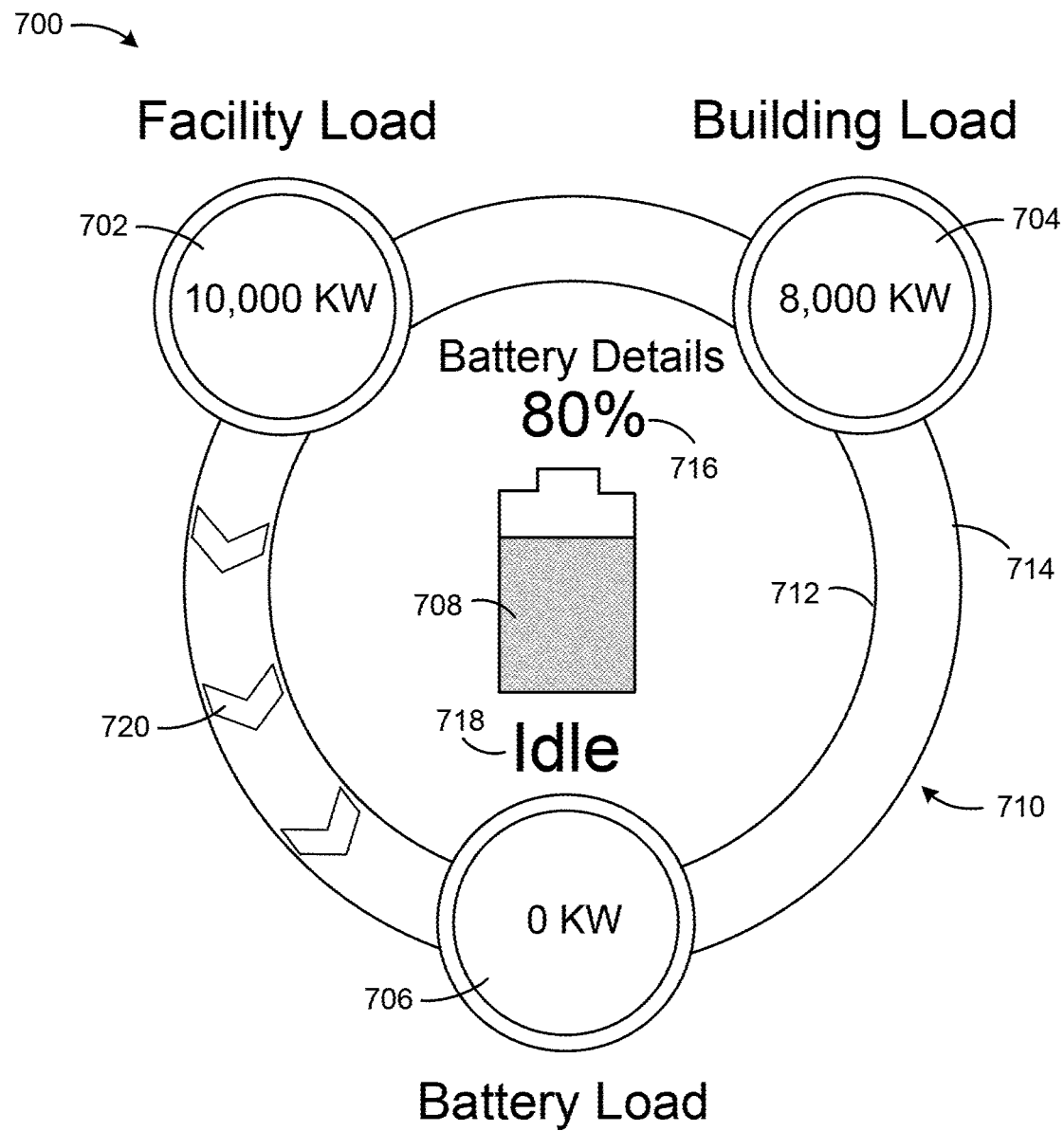
FIG. 7 is a drawing of a graphical user interface which can be generated by the system of FIG. 5, according to an exemplary embodiment.

Referring now to FIG. 7, a drawing of a graphical user interface 700 which can be generated by integration engine 506 is shown, according to an exemplary embodiment. Interface 700 is an example of an interface which can be presented to a user to graphically indicate the state of one or more batteries in a frequency response optimization system (e.g., system 100), a photovoltaic energy system (e.g., system 300), an energy storage system (e.g., system 500), a ramp rate control system, a building automation system, or any other system that stores electrical energy in batteries. Interface 700 may be referred to as a "Circle of Current" interface since it uses several circles to indicate the electric current flow in the system. Interface 700 can be used to represent the operational state of a battery system or other energy storage system. In some embodiments, interface 700 is used within a system overview graphic showing energy flow and the status of an energy system graphic.

Interface 700 is shown to include a plurality of circles 702, 704, 706, and 710. Circle 710 may be larger than circles 702-706 and may be defined by an inner circumference 712 and an outer circumference 714. The two circumferences 712-714 may be concentric with each other. In some embodiments, the shaded area between inner circumference 712 and an outer circumference 714 changes color based on the current state of the battery. For example, the shaded area may be colored gray when the battery is idle, blue when the battery is charging, and green when the battery is discharging.

Circles 702-706 are shown as satellite circles and may be located along circle 710 such that each of circles 702-706 at least partially overlaps with the area between inner circumference 712 and outer circumference 714. Circle 702 is shown as a facility load circle and may indicate the current electric load of a facility that receives power from one or more batteries. Circle 704 is shown as a building load circle and may indicate the current electric load of one or more buildings in the facility. Circle 706 is shown as a battery load circle and may indicate the current electric load on the batteries.

Within circle 710, several graphics 708, 716, and 718 are shown. Graphic 708 is shown as a battery graphic. The shape of battery graphic 708 may represent a battery. Battery graphic 708 may show visually the level of battery charge. In some embodiments, the color of battery graphic 708 changes to reflect the current level of charge. For example, battery graphic 708 may be colored green when the battery charge level is above a given threshold. As the battery charge level drops, the color of battery graphic 708 may change to yellow, orange, red, or any other colors as various charge level thresholds are crossed. Graphic 716 may show the current battery charge as a percentage of the total battery capacity (e.g., 80%). Graphic 718 may indicate whether the battery is currently charging, discharging, or idle (i.e., neither charging nor discharging).

In some embodiments, interface 700 includes moving arrows 720 that emphasize the battery state. Arrows 720 may move clockwise and may point toward battery load circle 706 when the battery is charging. Arrows 720 may move counterclockwise and may point away from battery load circle 706 when the battery is discharging. Arrows 720 may disappear and may not be shown in interface 700 when the battery is idle.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. An energy storage system comprising:
   a plurality of physical devices comprising at least a battery and a power inverter operable to charge and discharge the battery, each of the physical devices storing one or more data points; and
   an integration engine comprising a processing circuit having a processor and memory, the memory storing a virtual device network comprising:

a plurality of virtual devices, each of the virtual devices comprising one or more attributes; and a virtual device manager configured to map the attributes of the virtual devices to corresponding data points stored by the physical devices and update the attributes of the virtual devices in response to detecting changes in value of the corresponding data points stored by the physical devices;

wherein:

at least one of the physical devices is a non-BACnet device and at least one of the virtual devices is a virtual BACnet device;

the integration engine comprises a data transfer layer configured to provide the one or more data points stored by the non-BACnet device to the virtual device manager; and the virtual device manager is configured to translate the data points stored by the non-BACnet device into the attributes of the virtual BACnet device.

2. The energy storage system of claim 1, further comprising a circuit configured to interact with the virtual devices by reading and writing the attributes of the virtual devices;

wherein the virtual device manager is configured to update the data points stored by the physical devices in response to detecting changes in value of corresponding attributes of the virtual devices.

3. The energy storage system of claim 1, further comprising a circuit configured to operate the power inverter by writing a power setpoint for the power inverter to a power setpoint attribute of the virtual devices;

wherein the virtual device manager is configured to update a corresponding power setpoint data point stored by the power inverter in response detecting a change in the power setpoint attribute of the virtual devices.

4. The energy storage system of claim 1, wherein:

the plurality of virtual devices comprise a first virtual device having a first attribute and a second attribute;

the plurality of physical devices comprise a first physical device storing a first data point and a second physical device storing a second data point; and the virtual device manager is configured to:

map the first attribute of the first virtual device to the first data point stored by the first physical device; and map the second attribute of the first virtual device to the second data point stored by the second physical device.

5. The energy storage system of claim 1, wherein:

the plurality of virtual devices comprise a first virtual device having a first attribute and a second virtual device having a second attribute;

the plurality of physical devices comprise a first physical device storing a first data point and a second data point; and the virtual device manager is configured to:

map the first attribute of the first virtual device to the first data point stored by the first physical device; and map the second attribute of the second virtual device to the second data point stored by the first physical device.

6. The energy storage system of claim 1, wherein the plurality of virtual devices comprise a battery container virtual device representing a battery container that contains the plurality of physical devices.

7. The energy storage system of claim 6, wherein:

the battery container virtual device comprises a set of battery container attributes;

a first set of the set of battery container attributes are mapped to one or more of the data points stored by a first physical device of the plurality of physical devices; and a second set of the set of battery container attributes are mapped to one or more of the data points stored by a second physical device of the plurality of physical devices.

8. The energy storage system of claim 1, wherein the virtual device manager is configured to:

calculate a derived data point using one or more of the data points stored by the physical devices; and map the derived data point to one or more of the attributes of the virtual devices.

9. The energy storage system of claim 1, wherein at least one of the virtual devices represents a control algorithm and comprises attributes corresponding to inputs and outputs of the control algorithm.

10. A method for operating an energy storage system, the method comprising:

operating a plurality of physical devices of the energy storage system, the physical devices comprising at least a battery and a power inverter that operates to charge and discharge the battery;

storing one or more data points associated with operating the physical devices within the physical devices;

generating and storing a virtual device network within an integration engine, the virtual device network comprising a plurality of virtual devices and a virtual device manager, each of the virtual devices comprising one or more attributes;

automatically mapping, by the virtual device manager, the attributes of the virtual devices to corresponding data points stored by the physical devices;

updating, by the virtual device manager, the attributes of the virtual devices in response to detecting changes in value of the corresponding data points stored by the physical devices;

wherein at least one of the physical devices is a non-BACnet device and at least one of the virtual devices is a virtual BACnet device;

the method further comprising:

providing the one or more data points stored by the non-BACnet device to the virtual device manager via a data transfer layer; and translating, by the virtual device manager, the data points stored by the non-BACnet device into the attributes of the virtual BACnet device.

11. The method of claim 10, further comprising:

using a controller to interact with the virtual devices by reading and writing the attributes of the virtual devices; and updating the data points stored by the physical devices in response to detecting changes in value of corresponding attributes of the virtual devices.

12. The method of claim 10, further comprising:

operating the power inverter by writing a power setpoint for the power inverter to a power setpoint attribute of the virtual devices; and updating a corresponding power setpoint data point stored by the power inverter in response detecting a change in the power setpoint attribute of the virtual devices.

13. The method of claim 10, wherein:

the plurality of virtual devices comprise a first virtual device having a first attribute and a second attribute;

the plurality of physical devices comprise a first physical device storing a first data point and a second physical device storing a second data point; and mapping the attributes of the virtual devices to corresponding data points stored by the physical devices comprises:

mapping the first attribute of the first virtual device to the first data point stored by the first physical device; and mapping the second attribute of the first virtual device to the second data point stored by the second physical device.

14. The method of claim 10, wherein:

the plurality of virtual devices comprise a first virtual device having a first attribute and a second virtual device having a second attribute;

the plurality of physical devices comprise a first physical device storing a first data point and a second data point; and mapping the attributes of the virtual devices to corresponding data points stored by the physical devices comprises:

mapping the first attribute of the first virtual device to the first data point stored by the first physical device; and mapping the second attribute of the second virtual device to the second data point stored by the first physical device.

15. The method of claim 10, wherein the plurality of virtual devices comprise a battery container virtual device representing a battery container that contains the plurality of physical devices.

16. The method of claim 15, wherein:

the battery container virtual device comprises a set of battery container attributes; and mapping the attributes of the virtual devices to corresponding data points stored by the physical devices comprises:

mapping a first set of the set of battery container attributes to one or more of the data points stored by a first physical device of the plurality of physical devices; and mapping a second set of the set of battery container attributes to one or more of the data points stored by a second physical device of the plurality of physical devices.

17. The method of claim 10, further comprising:

calculating a derived data point using one or more of the data points stored by the physical devices; and mapping the derived data point to one or more of the attributes of the virtual devices.

18. The method of claim 10, wherein at least one of the virtual devices represents a control algorithm and comprises attributes corresponding to inputs and outputs of the control algorithm.

* * * * *